No. 650,183. Patented May 22, 1900.
L. R. LINDLEY.
FILLER FOR PACKING BOXES.
(Application filed Aug. 21, 1899.)

(No Model.) 2 Sheets—Sheet 1.

WITNESSES:
G. H. Blaker.
M. C. Buck.

INVENTOR.
Lee R. Lindley.
BY V. H. Lockwood
His ATTORNEY.

No. 650,183. Patented May 22, 1900.
L. R. LINDLEY.
FILLER FOR PACKING BOXES.
(Application filed Aug. 21, 1899.)

(No Model.) 2 Sheets—Sheet 2.

WITNESSES:
G. H. Blaker.
M. C. Buck

INVENTOR.
Lee R. Lindley
BY V. H. Lockwood
His ATTORNEY.

THE NORRIS PETERS CO., PHOTO-LITHO., WASHINGTON, D. C.

UNITED STATES PATENT OFFICE.

LEE R. LINDLEY, OF ANDERSON, INDIANA.

FILLER FOR PACKING-BOXES.

SPECIFICATION forming part of Letters Patent No. 650,183, dated May 22, 1900.

Application filed August 21, 1899. Serial No. 727,922. (No model.)

*To all whom it may concern:*

Be it known that I, LEE R. LINDLEY, of Anderson, county of Madison, State of Indiana, have invented a certain new and useful Filler for Packing-Boxes; and I do hereby declare that the following is a full, clear, and exact description thereof, reference being had to the accompanying drawings, in which like numerals refer to like parts.

This invention relates to a filler for packing-boxes made of strawboard or other suitable material.

The chief feature consists in cutting or otherwise taking the cross-pieces bodily out of the main pieces or strips to form the filler. In such case only one cut is made, and the cross-pieces thus cut out of the main piece or strip when the filler is put together are inserted in the openings in the main pieces or strips caused by cutting out such cross-pieces. Furthermore, in cutting out such cross-pieces the cut is in such form as to leave suitable notches in said cross-piece and also in the main pieces or strips to lock the two together when in place and also to hold in place any other cross-pieces that may be put in. These, with the other features of my invention, will be more fully understood from the accompanying drawings and the description of one form of device embodying my said invention.

Figure 1:
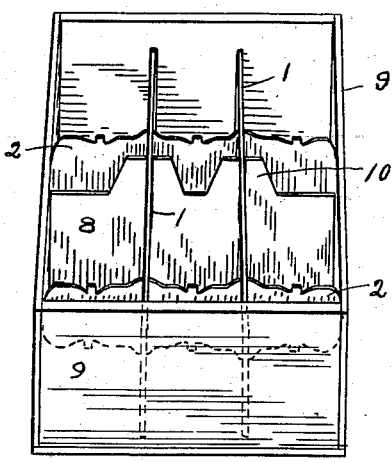
Figure 2:
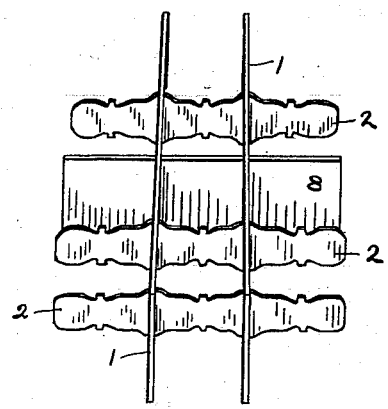
Figure 3:
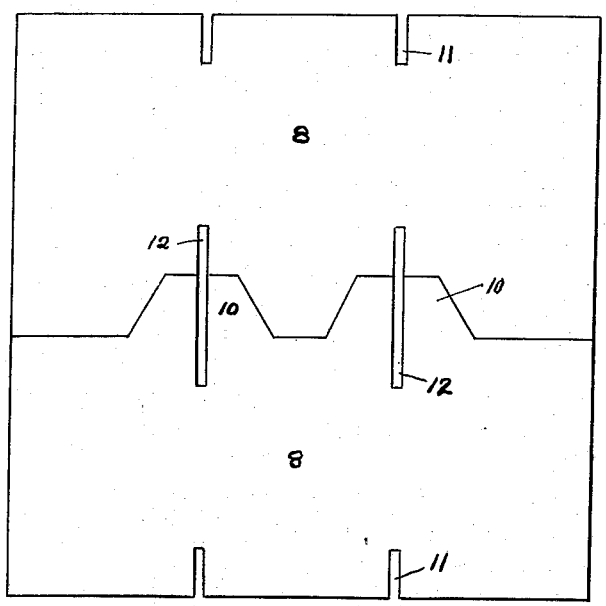
Figure 4:
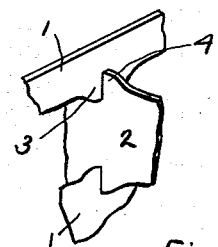
Figure 5:
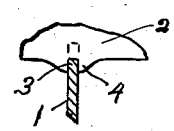
Figure 6:
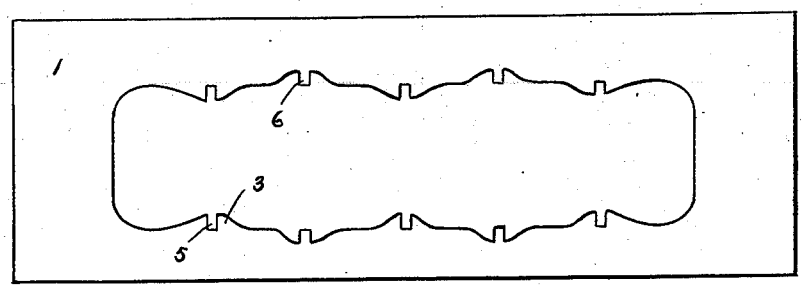
Figure 7:
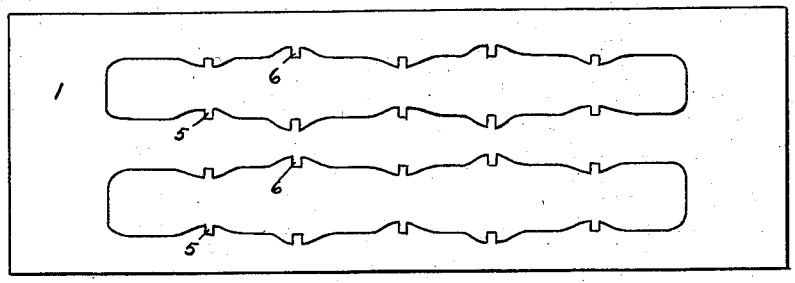
Figure 8:
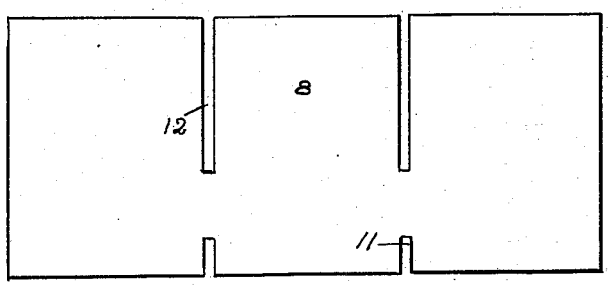
Figure 9:
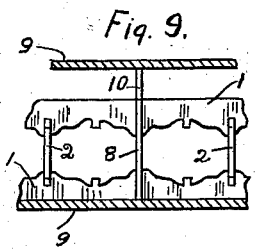
Figure 10:
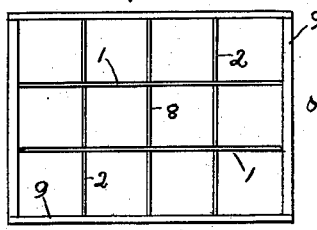

In the drawings, Figure 1 is a perspective of a filler embodying my invention with one cross-piece cut out of each main piece. Fig. 2 is the same with two cross-pieces cut out of each main piece. Fig. 3 is a blank out of which the center cross-pieces are cut and after the same have been cut. Fig. 4 is a perspective of the lock or joint between a main piece and a cross-piece. Fig. 5 is a section through the lower part of the main piece shown in Fig. 4 immediately to one side of the cross-piece at the joint. Fig. 6 is a plan of the main piece or strip after a cross-piece has been cut out of it. Fig. 7 is a plan of a main piece after two cross-pieces have been cut out of it. Fig. 8 is a plan of the central cross-strip in modified form, the upper extensions being omitted. Fig. 9 is a vertical cross-section of the packing-box. Fig. 10 is a plan of the packing-box.

In detail, 1 represents the main pieces or strips. They are preferably rectangular, with the length equivalent to the internal length of the packing-box 9 and with the width high enough to protect the bottles packed in the box. The filler shown is made to pack a dozen bottles. In this there are two of said main pieces. The cross-pieces 2 are cut out of the main pieces, as shown in Figs. 6 and 7. Said cross-pieces are cut with an irregular contour, as shown in said figures, in order to provide interlocking extensions 3 in the main and cross pieces. These extensions are provided with notches 5 in the main pieces and corresponding notches in the cross-pieces that engage each other when the pieces are put in place. It is observed in the outline shown in Figs. 6 and 7 that where the extension 5 is located in the main piece a corresponding depression is made in the cross-piece cut out, and where the extension in the cross-piece is located there is a corresponding depression in the main piece; but in the main piece it is observed that there are three pairs of notches, one in the middle and one on each side of the middle pair, while in the cross-pieces there are only two pairs of notches, each located at a point about one-third the length of the cross-piece away from its ends, so that in cutting out a cross-piece there will be one pair of extensions on the cross-piece between the middle pair and the end pair of notches in the main piece. Hence with this arrangement the pairs of notches in the cross-pieces are the same distance apart as the pair of notches in the main pieces, whereby said pieces when fitted together interlock and form a rectangular receptacle for the bottle. When the notches in the cross-pieces are cut out, they leave a tongue 6, as shown in Fig. 6, in the main piece, and, on the contrary, the cutting of the notches 5 leaves a corresponding tongue on the cross-pieces. Out of two main pieces, therefore, two cross-pieces are cut, as above specified. In putting the pieces together to make the filler these two cross-pieces thus cut out are extended through the openings left in the main pieces, when said cross-pieces are cut out and fitted in the end pairs of notches 5 of the two main pieces. A middle piece 8 is placed to interlock with the middle pair of notches in the two main pieces. The filler when thus formed is placed in the box 9, thereby forming twelve rectangular compartments in said box for the reception of bottles. The crosspieces are after being inserted in the openings in the main pieces twisted or turned into interlocking position. This is possible because the cross-pieces can be bent somewhat and the upper and lower sides of the main pieces can be pulled somewhat apart in their weakened condition; but they are strong enough to hold the parts of the filler together and protect the bottles packed in the same.

The middle piece 8 I preferably cut out of a sheet, as shown in Fig. 3, so as to have extensions 10, that when the filler is formed extend upward and prevent the filler from being elevated and getting above the body of the bottles. This results from the extensions engaging the lid of the box. Out of one sheet of strawboard or other suitable material, as shown in the outline in Fig. 3, two of those central pieces are cut, the lower one having four of those upward extensions and the upper one having three—a central one and two at each end. In cutting these in this way I economize material. Where there is no need of said extensions, they may be omitted, as in the central piece shown in Fig. 8.

The central pieces are provided with incisions or notches 11 on the bottom, that are comparatively short, and corresponding incisions or notches 12 at the upper end. In making a filler said central piece is first inserted through the openings in the main piece until the slots or notches in it register with the main pieces. The central piece is then turned up into position so that the notches in it receive the upper and lower parts of the main pieces.

With certain goods it is desirable to make the main piece like that shown in Fig. 7, so as to have a central strip, as well as one at the top and bottom. In such case two crosspieces are cut out. These are like the other cross-pieces. There is no difference, excepting in number. The central piece, however, in such case must have one of its slots, preferably the lower one, 11, cut from the top, so as to enable said central piece to stride the middle and lower strips of the main piece. In fact, the number of strips on the main piece can be increased, if desired, there always being cut out as many cross-pieces as there are openings in said main piece, so that the interlocking construction is the same in principle.

This construction of filler causes a great economy in material, as you get the crosspieces out of the main pieces without resorting to extra pieces, making a saving of about one-half of the material, and not only is there this result, but also a durable structure is made wherein the pieces can be easily put together.

What I claim as my invention, and desire to secure by Letters Patent, is—

1. A filler for packing-boxes including a series of parallel main pieces, and cross-pieces cut out of the main pieces and fitted at right angles thereto in the openings made in said main pieces by cutting out said cross-pieces.

2. A filler for packing-boxes including a series of parallel main pieces, cross-pieces so cut out of the main pieces as to leave corresponding notches in the two sets of pieces that engage and hold the pieces in place and enable the cross-pieces to be inserted in the openings made in the main pieces by cutting out said cross-pieces.

3. A filler for packing-boxes including a series of main pieces, cross-pieces so cut out of them as to leave certain inward extensions on the main pieces and outward extensions on the cross-pieces and notches on said extensions that said cross-pieces may extend through the openings in said main piece and be interlocked in said main piece.

4. A filler for packing-boxes including a series of parallel main pieces, and cross-pieces so cut out thereof as to leave extensions with notches therein at an equal distance apart in both the main pieces and cross-pieces.

5. A filler for packing-boxes including a series of parallel main pieces, cross-pieces so cut out of the main pieces as to leave alternating extensions on the main pieces and cross-pieces with notches in said extensions, and an extra central cross-piece, substantially as set forth.

6. A filler for packing-boxes including main pieces with an opening therethrough so cut out as to leave on the upper and lower sides of the opening alternating notches and extensions, and cross-pieces of the same dimensions and outlines as the opening in the main pieces.

7. A filler for packing-boxes including main pieces with an opening having on its upper and lower sides alternating outward and inward extensions, the inward extensions having notches in them and the outward extensions having a tongue in them, and crosspieces of the same dimensions and outline as the opening in said main pieces.

In witness whereof I have hereunto affixed my signature in the presence of the witnesses herein named.

LEE R. LINDLEY.

Witnesses:
FRANK MATTHEW,
C. W. RISDON.